United States Patent
Bachmann et al.

(10) Patent No.: US 7,653,467 B2
(45) Date of Patent: Jan. 26, 2010

(54) METHOD FOR PRE-SETTING A PASSENGER PROTECTION SYSTEM FOR A VEHICLE

(75) Inventors: Roland Bachmann, Sindelfingen (DE); Karl-Heinz Baumann, Bondorf (DE); Rainer Justen, Altdorf (DE); Rodolfo Schoeneburg, Hechingen (DE)

(73) Assignee: Daimler AG, Stuttgart (DE)

( * ) Notice: Subject to any disclaimer, the term of this patent is extended or adjusted under 35 U.S.C. 154(b) by 529 days.

(21) Appl. No.: 10/545,433

(22) PCT Filed: Jan. 24, 2004

(86) PCT No.: PCT/EP2004/000589

§ 371 (c)(1),
(2), (4) Date: Apr. 18, 2006

(87) PCT Pub. No.: WO2004/071816

PCT Pub. Date: Aug. 26, 2004

(65) Prior Publication Data

US 2006/0229784 A1    Oct. 12, 2006

(30) Foreign Application Priority Data

Feb. 14, 2003    (DE) ................................ 103 06 159

(51) Int. Cl.
*B60R 21/01* (2006.01)
(52) U.S. Cl. ...................................................... 701/45
(58) Field of Classification Search .................... None
See application file for complete search history.

(56) References Cited

U.S. PATENT DOCUMENTS

| 6,100,811 A * | 8/2000 | Hsu et al. ................... 340/5.83 |
| 6,198,996 B1 | 3/2001 | Berstis |
| 6,724,920 B1 * | 4/2004 | Berenz et al. ............... 382/118 |
| 2002/0089157 A1 | 7/2002 | Breed et al. |
| 2003/0204290 A1 * | 10/2003 | Sadler et al. .................... 701/1 |
| 2005/0080533 A1 * | 4/2005 | Basir et al. ..................... 701/45 |

FOREIGN PATENT DOCUMENTS

| DE | 32 00 749 A1 | 7/1983 |
| DE | 41 12 579 A1 | 10/1991 |
| DE | 44 21 508 A1 | 1/1994 |
| DE | 198 40 955 A1 | 3/2000 |
| DE | 198 56 129 A1 | 6/2000 |
| DE | 199 52 854 C1 | 8/2001 |
| DE | 698 11 195 T2 | 6/2003 |

(Continued)

OTHER PUBLICATIONS

Japanese Office Action dated Jan. 14, 2009 including English translation (Ten (10) pages).

*Primary Examiner*—Michael J. Zanelli
(74) *Attorney, Agent, or Firm*—Crowell & Moring LLP

(57) ABSTRACT

A vehicle occupant protection system of a vehicle having a plurality of adaptive protection system components assigned to a seat in the vehicle, is preset using data relating to the individual occupant of the seat. The identity of the occupant is determined for at least one seat, and a stored safety profile which is assigned to the identified person is retrieved. The protection system components which are assigned to the seat are then set using the safety profile.

4 Claims, 1 Drawing Sheet

FOREIGN PATENT DOCUMENTS

| | | |
|---|---|---|
| JP | 3-135853 A | 6/1991 |
| JP | 2000-211478 A | 8/2000 |
| JP | 2001-155050 A | 6/2001 |
| JP | 2002-274305 A | 9/2002 |
| WO | WO 99/01315 A1 | 1/1999 |

* cited by examiner

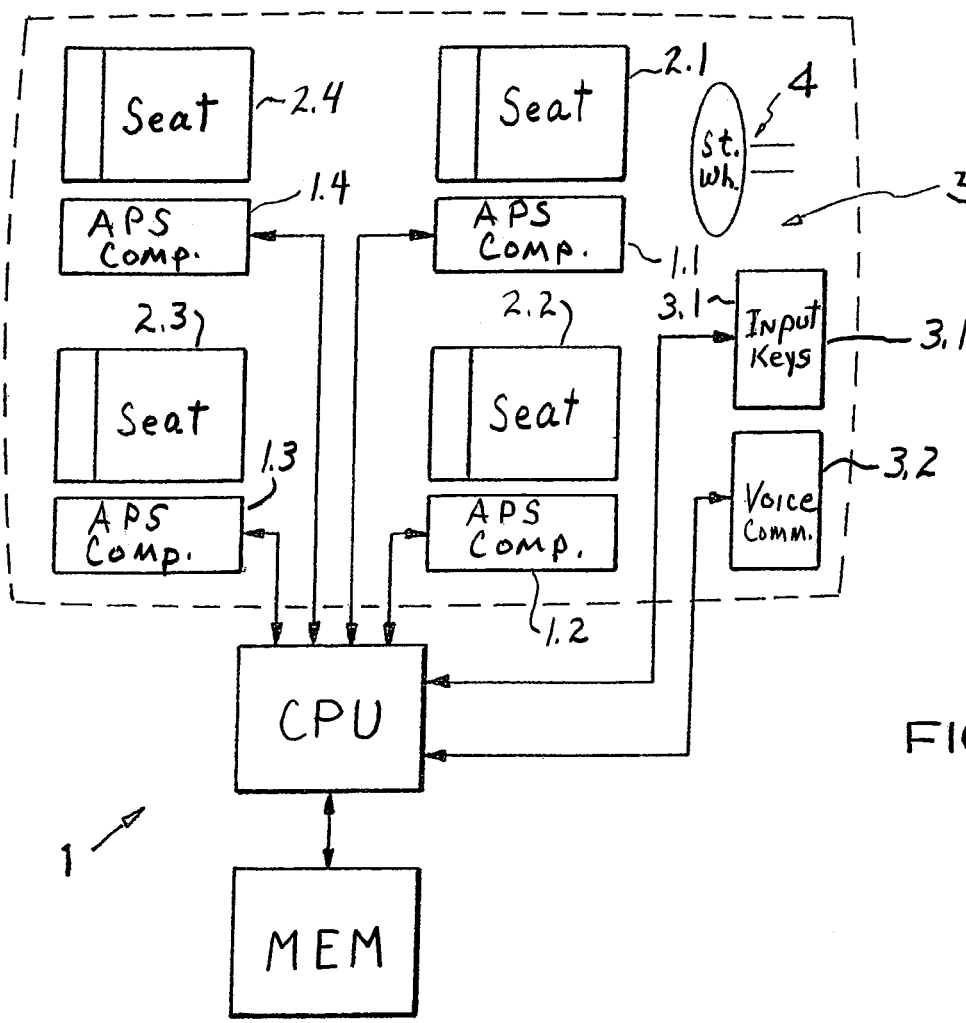
FIG.

METHOD FOR PRE-SETTING A PASSENGER PROTECTION SYSTEM FOR A VEHICLE

BACKGROUND AND SUMMARY OF THE INVENTION

This application claims the priority of German patent document 103 06 159.2, filed Feb. 14, 2003 (PCT International Application No. PCT/EP2004/000589, filed Jan. 24, 2004), the disclosure of which is expressly incorporated by reference herein.

The invention relates to a vehicle occupant protection system, and to a method for presetting such an occupant protection system.

A vehicle occupant protection system disclosed in German patent document DE 41 12 579 A1 comprises adaptive protection system components such as seat belt, airbag, knee pad and adjustable seat. A vehicle occupant behavior simulation program simulates the behavior of a vehicle occupant when a shock load impinges on the vehicle, and the parameters are determined for actuating the protection system components so that the load on the vehicle occupant is minimized. During the simulation, different data items are required, including measured vehicle collision data and vehicle data stored in advance at the factory as well as measured vehicle occupant position data and specific vehicle occupant data such as, for example, sex, age, weight, size, percentage etc. which are input by means of a data input device before the journey is started. Data can be input manually or via a card reader which reads a person-related data card with the specific vehicle occupant data. When a data card is used, comprehensive biometric data, which has been determined in advance during physical examinations, can be transferred to the computer. Such data may include, for example, the length, weight, center of gravity, and moment of inertia of a respective body part of the vehicle occupant, and connecting characteristics such as angle/torque characteristics of each joint of the vehicle occupant. With this precise data it is possible to better adapt the triggering of the protection system components to the vehicle occupant.

Although the setting of the vehicle occupant protection system by means of a data card readily permits expansion of the user group of a vehicle, it is considered disadvantageous that in those instances in which the vehicle is used almost exclusively by a very limited group of users (for example members of a family), it is still necessary continuously to carry the data card on one person, and to read it in whenever a journey is started. This requirement can be considered burdensome.

The prior art discloses various devices for automatically setting and adapting adjustable and settable vehicle systems which do not relate to safety-related functions. These include, for example, comfort functions, such as audio devices, air conditioning system, seat, steering wheel, instrument lighting, or driving functions, such as automatic transmission, engine and chassis controls.

German patent document DE 3200749 A1, for example, discloses a device for automatically setting and adapting support systems in a motor vehicle to the individual requirements and desires of the driver, by coding the ignition key in a user-specific fashion. The settings are carried out automatically when the ignition key is actuated. To do this, each person requires an individually adapted ignition key with an individually adapted code. The aids which are to be adapted are comfort functions, such as audio devices, air conditioning system, seat, steering wheel, rearview mirror, and instrument lighting.

German patent document DE 198440955 A1 discloses the idea of storing the vehicle configuration data relating to a user for the purpose of adjusting the gearbox and for energy management as well as the customary comfort setting data on a chip card to be carried by the person. Data relating to the person-related access authorization or use authorization can also be stored. Chip card reading devices can be arranged at a plurality of locations in the vehicle, so that all the devices can be configured from the driver's seat, while for other seats, only for the devices which are assigned to this seat can be controlled. This technique provides a large group of users with an easier way of performing user-specific setting of the vehicle which is being used, and is suitable in particular for fleets of vehicles, car sharing and hire vehicle systems.

International patent document WO 99/01315 discloses that, for the purpose of performing user-specific setting of a vehicle with adjustable or settable assemblies such as, for example, an engine, gearbox, chassis, seat, immobilizer or air conditioning system, the identity of the driver is first determined. Prestored user-specific properties are called, and corresponding setting of the vehicle systems is performed using the identity and the user-specific properties. The user-specific data is stored in a system memory mounted in the vehicle, and is activated by a suitable identification means such as, for example, voice, chip card, user-specific vehicle key, inputting of a personal identification number, detection of a fingerprint or the like. This method is used exclusively to adapt the vehicle to the driver's requirements. There is no provision for the vehicle to be adapted to the vehicle occupants in the other seats. There is also no consideration of an application for the adaptation of vehicle occupant protection systems.

One object of the invention is to provide a vehicle occupant protection system which can be simply and reliably adapted to the occupants of a vehicle.

This and other objects and advantages are achieved by the method and apparatus according to the invention, in which the identity of the occupant is determined for at least one seat, and a safety profile which is stored in the vehicle and is assigned to the identified person, is retrieved. The protection system components which are assigned to the seat are then set using the safety profile.

One advantage of the invention is that the vehicle occupant protection system can be adapted optimally to the individual physiological properties of the vehicle occupants, because the safety-related data (safety profile) of predetermined users is stored in the vehicle in an individual-specific fashion and can be accessed by means of a suitable identification method. As a result, optimum protection can be provided, for example for the members of a family or a car pool which use a specific vehicle regularly. Even if the invention provides adaptation for all the seats, in one simple embodiment it is possible to provide for adaptation for only the driver, for example.

The storage of the individual-related data in the vehicle (and not, for example, on a chip card which has to be carried on the person) has the advantage that such data is satisfactorily protected against tampering or incorrect use in the vehicle. After correct identification, the data is passed only within the vehicle in order to preset the vehicle occupant protection system. Reliable identification devices are well known from the prior art.

In one advantageous embodiment, a number of the data items which are stored in the vehicle for the safety profile (in particular, biometric data such as, for example, body size, body proportions or body weight) are varied according to a predetermined relationship as a function of the age of the identified person. As a result, for example in the case of children and young people, it is possible to simulate the growth in the biometric data over time due to the growth of the person's body, for example by means of a growth curve. This permits the safety profile also to "grow in step" and the otherwise necessary manual adaptation at short intervals, for example yearly intervals, can be eliminated provided that tolerance limits are complied with. The system can also issue a message if it appears expedient to use the child's seat for the next age group. It is also possible for automatic adaptation to be carried out if a disablement, which applies only for a limited time, is input. For example, it is thus possible to input the start of a pregnancy in order to adapt the parameters of the protection system automatically to the pregnancy profile in the nine months of the pregnancy.

In a further advantageous development, the individual-specific data is made available in order to provide information in a rescue situation. In such a context in particular biographic and medical data is of interest.

Creation of the Safety Profile to be Stored in the Vehicle

In a personal safety consultancy appointment, individual data is acquired for the persons who are anticipated to be regular drivers or occupants of the vehicle, in order to create the safety profile. A safety profile is created for each person, using the following data initially:

biometric data such as body size, body proportions, body weight (further biometric data is specified in German patent document DE 41 12579 A1) and if appropriate the child's which is being used;

biographic data, such as personal details, date of birth, sex and persons or organizations to be informed;

medical data such as state of health, illnesses, infirmities, pregnancy, blood group, allergies, implants, medicines; and identification data such as name, password, fingerprint, voice sample, picture.

The biometric data is used principally for individually adapting the vehicle occupant protection system, while the biographic data is intended to be passed on to a rescue control center in the event of an accident. The identification data is used for reliably identifying a vehicle occupant and is intended to ensure that the stored safety profiles are reliably assigned to the vehicle occupants. Since such identification data is also individual-related, it can be included in the data record of the individual-related safety profile.

In vehicles with a simple vehicle occupant protection system, protection system components are triggered if an impact is sensed, for example by an acceleration sensor. In more advanced vehicle occupant protection systems, certain (specifically, reversible) protection system components, such as reversible seat belt pretensioners and movable seats, are triggered if there are signs that an accident is directly imminent. This information may be derived by sensors, for example from the driver's reactions, vehicle behavior or by predictive observation of the surroundings. In such a vehicle occupant protection system, the individual parameters which are necessary for preventive triggering are to be additionally specified (PRE-SAFE positions).

Typical adaptive protection system components and their parameters are:

multistage airbag with adjustable inflation characteristics for each airbag stage, for example filling behavior, outflow behavior, airbag size or volume flow of the gas generator;

seat belt of adjustable force level and force profile of the limitation of the belt force and adjustable force level of the seat belt pretensioner or, in the case of a two-stage seat belt pretensioner with adjustable force level for both stages (for example reversible first stage and pyrotechnic second stage);

seat which can be moved preventively into a sitting position (PRE-SAFE position) which has an optimum protection effect, with an adjustable headrest position, backrest position, longitudinal adjustment, seat height or seat inclination angle;

upholstery components in the passenger compartment which can be adapted individually in terms of their characteristics (rigidity or displacement), for example extendible knee protector; and steering system with adjustable force level of possible longitudinal movement in the event of a crash.

In addition, parameters which are related to the driver may also be stored in the safety profile. The optimum setting of the latter parameters increases the driving safety in the normal driving mode, for example the setting of the interior mirrors and exterior mirrors, of the seat, the headrest and of the level of the seat belt. Fundamentally, individual adaptation also permits adaptation of the other safety-related variables, for example in the field of active safety (adjustment of the chassis, individual triggering parameters for an electronic stability program or brake assistant).

In one simple embodiment, the individual parameters for adaptation of the vehicle occupant protection system can be stored using a few items of biometric data on the basis of empirical values for each person. In this case, it is possible to distinguish between the various seats (driver's position, front seat, passenger's position, rear) in the vehicle and also to differentiate according to the triggering situation (preventative or triggered as a result of a crash). In this way, the optimum individual-related parameters for setting protection system components which were assigned to a seat are determined. These individual parameters are added to the safety profile, transferred to the vehicle-mounted memory and stored there individually for each person.

In another embodiment, the optimum parameters for setting the protection system components are determined with respect to a seat from the biometric data and from further data relating to the vehicle, by means of a simulation program such as is disclosed in German patent document DE 41 12 579 A1. In this case, the parameters can also be differentiated in terms of typical accident situations.

According to the invention the simulation may be carried out in a computer outside the vehicle, for example at the premises of the manufacturer of the vehicle or in the course of the safety consultancy appointment. The simulation for typical accident situations is then carried out by means of the data for the assigned person and for each respective seat in the vehicle, and the optimum parameters for setting the protection system components which are related to the respective seat are determined. These parameters are added to the safety profile and transferred in an individual-related fashion to the vehicle-mounted memory and stored there. It is thus possible to differentiate between typical hazard situations and actual accident situations.

Alternatively, the simulation can be carried out in a computer in the vehicle. When there is sufficient computing power, the simulation and the determination of the optimum parameters could also be carried out in advance, or even as an accident is happening, so that the vehicle occupant protection system could be adapted even better to the accident events. For example, the current seat position of the vehicle occupant or the collision parameters could be included in the simulation.

A number of illustrative examples will be used to explain how the protection system components can be suitably adapted as a function of a safety profile:

The retraction force of the reversible seat belt pretensioner and of the pyrotechnic pretensioner is adapted to the age, sex, and mass of the vehicle occupant.

The force and the force profile of the seat belt force limiter over the pulled-out length are adapted to the age, sex and mass of the vehicle occupant.

In special cases such as pregnancy, the tensioner force, the level of force limiter, the degree of filling of the airbag, the setting of the seat and the adjustment of the height of the seat belt can be adapted using the pregnancy profile.

In the case of children, the child seat is detected using the automatic child seat detection means and the optimum restraining function is set in conjunction with individual data and changes automatically as the child grows older. The driver is alerted when the child grows out of the current child's seat.

The seat, headrests and seat belt level adjusters on the B pillar are set as a function of the size and proportions of the vehicle occupants.

The degree of filling and the outflow behavior of the airbag are controlled as a function of the mass of the vehicle occupant.

Pretensioning function and limitation of the seat belt force are set automatically as a function of the child's age and as a function of the child's seat used.

The characteristic curve of active protection upholstery elements is adapted to, for example, the size and weight of the vehicle occupant.

Other objects, advantages and novel features of the present invention will become apparent from the following detailed description of the invention when considered in conjunction with the accompanying drawings.

BRIEF DESCRIPTION OF THE DRAWINGS

The single FIGURE shows a plan view of a passenger compartment of a vehicle with four seats 2.1-2.4 within the outline indicated by dashed lines, a steering wheel 4 being shown in front of the driver's seat 2.1.

DETAILED DESCRIPTION OF THE DRAWINGS

Referring to the FIGURE, each of the seats 2.1-2.4 is assigned one of the adaptive protection system components 1.1-1.4 of a vehicle occupant protection system 1, which also comprises a central processing unit 1.5 with a memory 1.6 mounted in the vehicle for storing individual-specific safety profiles. A person identification unit 3 can also be operated from the passenger compartment of the vehicle and is embodied here as a screen with input keys 3.1.

In addition or alternatively, for the purpose of identifying persons, it is possible to provide a voice communications device 3.2 which can output and input voice. A large number of other person identification devices 3 which are also suitable are known and have been mentioned at the beginning. Instead of directly inputting the names, systems can also be used to permit identification by comparison with stored acoustic voice patterns, fingerprint detection or picture recognition. A combination of identification methods is also possible in order to compensate for inaccuracies in the respective systems, through plausibility checking. Plausibility checking is also possible by analyzing the driving style and comfort settings, for example seat settings, radio transmitter selection, setting of the air conditioning system or by comparison with stored driving authorizations.

According to the invention, the following method occurs in the vehicle:

In a first step, the person identification device 3 determines the identity of the person occupying each seat 2.1-2.4. In this process, individual identification features recorded by the person identification device 3 are compared with the identification data of the stored safety profiles. When they correspond to the identification data of a safety profile the person is identified as a vehicle occupant and the associated safety profile is called in order to preset the vehicle occupant protection system. Inability to determine the identity is also recorded.

In a preferred embodiment, identification and assignment of seats are carried out by a control unit 1.5. For each seat 2.1-2.4, the control unit interrogates the name of the person occupying the seat together with the person identification unit 3 in a dialog with the vehicle occupants. The dialog can be carried out by means of voice output and voice input of a voice communication device 3.2 or by means of a screen and keypad 3.1.

In a second step, for each identified person the associated stored safety profile is called from a memory 1.6 and the protection system components 1.1-1.4 which are assigned to the seat 2.1-2.4 are set using the safety profile. If it is impossible to identify a person with a stored safety profile for an occupied seat, the assigned protection system component is preset in accordance with standard values which ensure the best possible safety level. Alternatively, if it was not possible to identify a person with a stored safety profile for an occupied seat, the control unit 1.1 can interrogate, in a dialog with the vehicle occupant, a number of biometric parameters (for example, size and weight) from which suitable parameters for setting the vehicle occupant protection system 1 are derived.

In one advantageous embodiment of the invention, after an accident the person-related data of identified vehicle occupants is made available for the purpose of recovery and/or first aid, for example by radio transmission to a rescue control center. In addition, the information relating to the seats of all the vehicle occupants or triggered protection system components can be made available.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for presetting a vehicle occupant protection system having a plurality of adaptive protection system components that are each assigned to a seat in the vehicle, based on data relating to the vehicle occupant, said method comprising:
    determining the identity of an occupant of at least one seat;
    retrieving from a memory mounted in the vehicle a safety profile which is assigned to the identified person and is stored in the memory; and
    setting the protection system components which are assigned to the seat, based on data contained in the safety profile;
    wherein, if the identity of the vehicle occupant occupying the seat cannot be determined, the protection system components assigned to the seat are preset according to standard settings.

2. A method for presetting a vehicle occupant protection system having a plurality of adaptive protection system components that are each assigned to a seat in the vehicle, based on data relating to the vehicle occupant, said method comprising:

determining the identity of an occupant of at least one seat;

retrieving from a memory mounted in the vehicle a safety profile which is assigned to the identified person and is stored in the memory;

setting the protection system components which are assigned to the seat, based on data contained in the safety profile; and performing a plausibility check regarding a determined identity of an occupant by comparing driving style or vehicle settings of said occupant with stored information regarding said occupant.

3. The method according to claim 2, wherein said vehicle settings comprise at least one of seat position, radio transmitter selection, or air conditioner settings.

4. The method according to claim 2, wherein said plausibility check further includes a comparison of determined occupant identity with stored driving authorizations.

* * * * *